United States Patent [19]

Feder et al.

[11] 3,907,901

[45] Sept. 23, 1975

[54] CONTINUOUS PROCESS FOR PREPARING CUMENE HYDROPEROXIDE

[75] Inventors: Raymond L. Feder, Philadelphia, Pa.; Robert Fuhrmann, Morris Plains; John Pisanchyn, Morristown, both of N.J.; Saul Elishewitz; Thomas H. Insinger, both of Philadelphia, Pa.; Chempolil Thomas Mathew, Randolph Township, N.J.

[73] Assignee: Allied Chemical Corporation, New York, N.Y.

[22] Filed: Apr. 5, 1973

[21] Appl. No.: 348,430

Related U.S. Application Data

[63] Continuation-in-part of Ser. No. 841,585, July 14, 1969, abandoned.

[52] U.S. Cl............................................. 260/610 B
[51] Int. Cl.² ................................... CO7C 73/08
[58] Field of Search ......... 260/610 B, 610 A, 621 C

[56] References Cited
UNITED STATES PATENTS

| 2,619,510 | 11/1952 | Armstrong et al. | 260/610 B |
|---|---|---|---|
| 2,633,476 | 3/1952 | Seubold | 260/610 B |
| 2,906,789 | 9/1959 | McNaughton | 260/610 B |

FOREIGN PATENTS OR APPLICATIONS

| 672,923 | 10/1963 | Canada | 260/610 B |

Primary Examiner—Bernard Helfin
Assistant Examiner—W. B. Lone
Attorney, Agent, or Firm—Roger H. Criss; Michael S. Jarosz

[57] ABSTRACT

An improved continuous process for preparing cumene hydroperoxide and phenol by the controlled liquid phase air oxidation of cumene in the absence of initiators, catalysts, additives or alkalizing agents. A mixture containing cumene having a purity of at least 99.8 percent, and recycle cumene hydroperoxide which has been purified by washing with aqueous alkali metal hydroxide, followed by water wash, is oxidized in a single or multiple stage system by continuously passing through the mixture a stream of gas containing at least 8 mol percent of oxygen at a rate wherein the ratio of the mols of oxygen supplied per hour to the maximum amount of oxygen consumable per hour exdeeds 0.25 and the exit gas contains from 3–10 percent oxygen; and when oxidation is effected in a mutiple stage system the temperature is maintained stepwise from about 120° to about 80°C. while the concentration of cumene hydroperoxide in the reaction mixture is permitted to increase stepwise from about 8 percent to about 40 percent.

7 Claims, No Drawings

CONTINUOUS PROCESS FOR PREPARING CUMENE HYDROPEROXIDE

CROSS-REFERENCE TO RELATED APPLICATION

This application is a continuation-in-part of our co-pending application Ser. No. 841,585 filed July 14, 1969, now abandoned.

BACKGROUND OF INVENTION

The preparation of phenol from cumene is well known. The process essentially involves two steps, namely oxidation of cumene to form cumene hydroperoxide and the subsequent decomposition of the peroxide to yield phenol and acetone. During the oxidation step wherein cumene is oxidized in the liquid phase using elemental oxygen, there are formed, depending on various oxidation influences, in addition to cumene hydroperoxide, varying amounts of certain by-products. These by-products include such substances as phenol, dimethyl phenyl carbinol, acetophenone, organic acids and other organic material. These by-products not only form at the expense of and hence decrease the yield of hydroperoxide, but often create problems when preparing cumene hydroperoxide, and/or phenol in a continuous process. For example, it is well known that the presence of phenol in the oxidation mixture, even in minute amounts, will effectively inhibit the oxidation. Similarly, the presence of excess acids or compounds capable of forming acids (i.e., by-products which may be carried over in cumene recycle streams) under the oxidation conditions also tend to inhibit the reaction by prematurely decomposing cumene hydroperoxide to phenol. In addition, certain by-products may decompose to compounds that do not inhibit oxidation, but are not readily separated from phenol in later stages of the process.

In an effort to overcome these problems and further maximize the yield of cumene hydroperoxide formed during the oxidation step, the prior art has suggested the oxidation be effected under various conditions. Thus, attempts have been made to alter the oxidation rate by using pure oxygen as the oxidizing agent; reduce the induction time by the use of certain initiators or "catalysts"; oxidizing in the presence of an alkaline agent; and employing certain additives having unknown action, but which seemingly affect oxidation rate and yield.

Thus, according to the prior art, in order to obtain satisfactory yields of cumene hydroperoxide by the liquid phase air oxidation of cumene, it is necessary that the oxidation be effected in the presence of an additive of some type.

It is quite apparent, however, that notwithstanding the advantages obtained by methods suggested by the prior art, the use of additives of the type mentioned above are not desirable when preparing cumene hydroperoxide on a commercial scale. Not only do these agents represent an added expense factor as relates to material costs and cost of capital equipment necessary to effect separation, but may even lead to a decrease in yield.

The improved process of the present invention obviates the problems encountered in the prior art by affording a process whereby cumene hydroperoxide and ultimately phenol is obtained in high yields without the aid of extraneous agents.

SUMMARY

An object of the present invention is provision of an improved continuous process for preparing cumene hydroperoxide and phenol in high yields by the controlled liquid phase air oxidation using selective conditions and without the aid of extraneous agents. More particularly, an object of the present invention is provision of an improved continuous process for preparing cumene hydroperoxide in high yields by contacting cumene with a continuous stream of a gas containing at least 8 mol percent of oxygen at a rate wherein the ratio of the mols of oxygen supplied per hour to the maximum amount of oxygen consummable per hour exceeds 0.25 and the exit gas contains 3–10 percent of oxygen; while maintaining the temperatures stepwise between about 120° and about 80°C. as the concentration of cumene hydroperoxide in the reaction mixture is permitted to increase stepwise from about 8 percent to about 40 percent; then condensing the exit gases and returning the unoxidized cumene, after purifying by treatment with an alkali metal hydroxide, followed by water wash, for recycling to the reaction mixture; said reaction being effected without the addition of initiators, catalysts or alkalizing agents.

DESCRIPTION OF THE PREFERRED EMBODIMENT

According to the improved process of the present invention, we have found that cumene hydroperoxide can be prepared from cumene in extremely high yields without the aid of any of the extraneous additive agents and particularly buffering agents of the type found useful and necessary when cumene hydroperoxide is prepared according to the prior art methods. This totally surprising and unexpected effect is accomplished by oxidizing cumene under conditions wherein there is maintained selected and integrated oxidation relationships among temperature, cumene quality, reactor residence time, and ratio of air to cumene introduced into the reaction zone.

In general the improved process of the present invention comprises the continuous oxidation of cumene in a single stage or series of stages wherein high quality cumene is initially brought into contact with a constant volume of an oxygen containing gas at a temperature of about 80°–120°C., preferably 80°–115°C., in the absence of an initiator, catalyst or alkalizer while continuously adding fresh cumene to the system and continuing until the cumene hydroperoxide concentration reaches 8–40 percent.

The term "liquid phase" as used herein means that the medium into which the gas containing molecular oxygen is introduced is liquid at the reaction temperature.

The term "oxygen containing gas" as used herein means ordinary air, or air enriched with oxygen.

The term "high quality cumene" as used herein means cumene having a purity of at least 99.8 percent and substantially acid free.

In the preferred embodiment of the present invention the oxidation is effected in a series of two or more oxidation zones or oxidizers. The oxidizing zones may be any suitably sized containers, tanks or vessels of the type well known in the art, adapted so that they may be operated sequentially and at different temperatures and further provided with means for uniformly distributing oxygen containing gas at the lower portion (i.e., as by spargers or stirrers) and means for venting and condensing spent gases and other gases or vapors formed during oxidation. The oxidation may however be effected in a single unit having 2 or more compartments adapted in a similar manner. Accordingly, a mixture is fed to the first oxidizing unit or zone consisting of fresh high purity cumene and purified recycled cumene which has also been freed of acid in an amount commensurate with streams leaving the oxidizers. Air is fed to the lower portion of each oxidizing unit by an air compressor and permitted to bubble up through the mixture at a rate to provide sufficient oxygen to effect oxidation and maintain the oxygen content of the exit gases between 3–10 percent. The oxidation is continued at a temperature of about 110°–120°C. preferably 110°–115°C. until the concentration of cumene hydroperoxide reaches about 8–15 weight percent of the reaction mass whereupon the effluent is then transferred successively to a second and third, etc., oxidizing unit, the mixture as it passes through each unit being continuously oxidized stepwise at a lower temperature and to an increasing concentration until in the last unit in the train the concentration of cumene hydroperoxide is increased to about 30–40 percent under temperature conditions of about 80°–90°C., when the train comprises about 4–6 units.

At the end of the oxidation process, the reaction mixture is vacuum flash distilled to concentrate the cumene hydroperoxide and recover unoxidized cumene. Cumene hydroperoxide in a concentration of about 80 percent is recovered from the bottom of the flash evaporators and unoxidized cumene obtained from the overhead condensors.

The concentrated cumene hydroperoxide thus obtained may be further purified if desired and decomposed to phenol and acetone by methods well known in the art.

As is indicated above, feed stock introduced into the first reactor comprises fresh and recycle cumene. The recycle cumene represents unoxidized cumene as recovered from the flash distillation and from gases leaving the oxidizers which are subsequently condensed and the residual cumene retained in the cooled vapor adsorbed on charcoal and eluted from the charcoal with steam.

In order to maintain the purity of the feedstock entering the oxidizers, it is necessary that cumene obtained from these sources be treated with alkali, suitable at 1 percent to 5 percent aqueous solution of an alkali metal hydroxide, to remove any traces of acidity or phenol that might be present. In addition to eliminating acid components and phenol by the alkali treatment, the recycle cumene is further treated as for example by subjecting to several washes to remove excess amounts of cations (i.e., Na+ or K+) entrained from the caustic wash.

Presence of such cations in the oxidation step tends to cause formation of undesirable by-products. Further, these cations tend to form salts with cumene hydroperoxide which, if permitted to remain in the oxidizer product tend to foul up the equipment, especially heat exchangers and distillation apparatus. In the past these precipitates were removed by filtration of the oxidizer product. However, due to their slimy consistency, filtration is difficult as well as dangerous. Cumene hydroperoxide and its salts which are removed in the filtration step are highly flammable and subject to autoignition when exposed to air. Hence, removal and disposal of filter cake resulting from oxidizer product filtration poses significant safety hazards. All of these problems are eliminated by the water wash following caustic treatment of recycle cumene in accordance with the method of the present invention.

Although the method described above relates to a continuous oxidation wherein the overall oxidation is effected in a multi-step process via a series of two to six, but preferably four to five oxidizers, it may also be carried out in a single oxidation zone. In oxidizing in a single stage the reaction is carried out in one of the tanks of the type aforementioned and in essentially the same manner except oxidation temperatures and cumene hydroperoxide levels remain relatively constant and in such a relationship so that prolonged residence times are avoided. The main disadvantage of a one-step process, however, is one of economy, relating to tank size or the size of the flash evaporator necessary to concentrate the formed cumene hydroperoxide.

As has been previously stated the unique aspect of our invention resides in the combined high quality feed cumene, reactor residence time and ratio of air to cumene introduced into the reaction, which we believe maintains in equilibrium low level of acids in the oxidizers.

For example, temperatures in excess of 120°C. for extended periods in any of the oxidation stages will have a deleterious effect on the process. Similarly, increasing cumene hydroperoxide concentration or increasing residence time appreciably results in the build-up of acidity and inhibitors, as will an insufficient supply of oxygen. Thus, in this latter aspect it is necessary to supply sufficient oxygen preferably in the form of air in an amount sufficient to maintain a high oxidation rate and yet maintain the oxygen content of the off-gases between 3–10 percent and preferably at about 5–7 percent.

This is accomplished by supplying to the reaction mixture a gas containing at least 8 and preferably about 20–21 mol percent oxygen at such a rate that the ratio R, defined below, exceeds 0.25.

$$R = \frac{\text{moles of oxygen fed to the reactor per hr.}}{\text{maximum moles of oxygen consumable per hr.}}$$

The maximum amount of oxygen consumable is defined as the amount of oxygen reacted per hour at the temperature under consideration, when the feed gas is pure oxygen.

Table I illustrates the relationship of this ratio on cumene hydroperoxide formation in the absence of a catalyst and shows that gas streams containing less than 8 percent oxygen will not produce cumene hydroperoxide at commercially acceptable rates. In all runs the oxidation mixture contained initially 246 g. of cumene and 0.8 mol percent of cumene hydroperoxide and the maximum oxygen consumption was determined with pure oxygen at the same temperature and considered the maximum rate obtainable.

TABLE I

| Run | Temp. °C. | % $O_2$ in Feed Gas | Mols $O_2$ Fed/Hr. | Max. $O_2$ Consumed/hr. Based on Pure $O_2$ | R | Avg. Reaction Mol % CHP/hr. | % Impurities in CHP at 22% Conversion |
|---|---|---|---|---|---|---|---|
| 1 | 95 | 2.7 | 0.019 | 0.054 | 0.35 | 0.14 | * |
| 2 | 95 | 6.2 | 0.044 | 0.054 | 0.81 | 0.24 | * |
| 3 | 95 | 10.5 | 0.073 | 0.054 | 1.35 | 0.865 | 2.6 |
| 4 | 95 | 21.0 | 0.146 | 0.054 | 2.7 | 0.87 | 2.6 |

* Due to extremely low conversions, the purity of CHP (cumene hydroperoxide) was not determined.

Table II shows the results obtained when cumene was oxidized over an extended period in a continuous laboratory oxidizer in the absence of a catalyst or alkalizer. During this period several levels of CHP were tested and although acidity increased with concentration slightly there was no effect on yield, off-gas, reaction rate or CHP levels. The cumene employed was of high quality and free of acid. The air rate, temperature, and oxygen content of off-gases was maintained at 1 liter per minute, 110°C., and 3–6 percent respectively, and the reactor contents maintained at 15 mols by continuous feed and product removal. The R ratio in this instance varied from 0.70 to 0.47 and the average residence time 3–4 hours.

Although the combined relationships must be maintained at all times within the limits established herein, oxidation conditions varying slightly may be permitted for short periods in order to establish or reestablish proper oxidizing conditions. Accordingly, in the event that acidities increase within one of the oxidizers in the series, the oxidation rate may be lowered by reducing oxidizer temperatures, while maintaining cumene feed rates and air at a constant rate until standard operating rates can be restored.

We do not understand fully the principles whereby we are able to obtain high yields of cumene hydroperoxide, but we believe that by our oxidizing conditions we are able to prevent the build-up of high acidity levels in the oxidation mixture.

110°C. A recycled cumene stream washed with aqueous sodium hydroxide and separated therefrom as below described was also fed continuously to this tank at a rate of about 25,000 pounds per hour. Air was bubbled upward through this tank at entering pressure of about 10 p.s.i.g. in order to maintain the oxygen content of vented gases between 3–6 percent, and the R values at 0.50, 1.34, 1.34 and 1.34, respectively, for each tank.

The liquid capacity of the tank gave a hold-up time in the tank of 5 hours. The cumene entering this tank was thus continuously oxidized to maintain cumene hydroperoxide concentration of the oxidation reaction mixture therein at about 10 parts per 100 parts by weight of reaction mixture, corresponding to oxidation rate therein of about 2 percent by weight of cumene hydroperoxide produced in the reaction per hour.

The effluent from the first tank passed to a second similar tank similarly supplied with air. The temperature in this second tank was about 90°C. and the hold-up time therein was about 5 hours. The reaction mixture in the second tank had cumene hydroperoxide concentration of about 18 percent by weight, corresponding to cumene hydroperoxide production rate of about 1.5 percent by weight per hour. The effluent passed to a third tank operating similarly at about 90°C. with cumene hydroperoxide concentration of about 26 percent by weight (rate about 1.4 percent per hour); then to a final tank operating similarly at about 88°C.

TABLE II

| Time Period (hr.) | Cumene Hydroperoxide (Wt. %) Range | Cumene Hydroperoxide (Wt. %) Avg. | Oxyd Rate (Mol %/hr.) | Acidity (ppm) Range | Acidity (ppm) Avg. | Phenol (ppm) | CHP Yield (Mol %) |
|---|---|---|---|---|---|---|---|
| 0 – 6.3 | 10.0– 8.5 | — | — | 13–26 | — | — | — |
| 6.3–15.6 | 8.1– 7.7 | 7.9 | 2.46 | 13–26 | 16 | 6,8 | — |
| 15.6–18.4 | 8.6– 8.8 | — | — | 19–26 | — | 8 | — |
| 18.4–23.5 | 9.2– 9.7 | 9.5 | 2.60 | 26–39 | 36 | 9 | — |
| 23.5–27.7 | 9.9–11.8 | — | — | 39–45 | — | 8 | — |
| 27.7–32.0 | 12.0–12.6 | 12.3 | 2.79 | 32–45 | 39 | 9 | — |
| 32.0–35.0 | 13.2–14.5 | — | — | 45–52 | — | — | — |
| 35.0–39.3 | 14.8–15.5 | 15.1 | 2.96 | 45–58 | 52 | — | 92.0 |
| 39.3–42.6 | 16.4–18.2 | — | — | 58–77 | — | — | — |
| 42.6–46.6 | 18.8–20.0 | 19.4 | 3.23 | 71–77 | 74 | 10 | 91.2 |
| 46.6–47.6 | 20.8 | — | — | 84 | — | — | — |
| 47.6–49.9 | 21.2–22.2 | 21.8 | 2.62 | 84 | 84 | 12 | 91.3 |
| 49.9–50.7 | 18.2 | — | — | 65 | — | — | — |
| 50.7–57.2 | 15.4–15.6 | 15.5 | 2.86 | 45–65 | 55 | 9,8 | 92.0 |

EXAMPLE 1

Cumene hydroperoxide was prepared continuously without the aid of additives using an oxidizing train comprising four tanks having a capacity of about 40,000 gal. each and equipped with the accessories mentioned above.

A fresh cumene stream amounting to about 8000 pounds per hour was fed continuously to the first of four oxidation tanks, this tank being operated at about with cumene hydroperoxide concentration of about 31 percent by weight (rate about 1 percent per hour).

The oxidized cumene product upon leaving the fourth tank was passed to a flash evaporator whereupon it was concentrated to about 80 percent and the unreacted cumene condensed, collected and treated with 2 percent NaOH, washed with water and the cumene layer separated therefrom. The vapors leaving the top of the oxidizers were similarly condensed, treated with NaOH. The cooled vent gases were adsorbed upon a charcoal filter to spring remaining cumene present. The total cumene thus recovered was combined, treated with 1 percent NaOH and subjected to two water washes to insure removal of sodium ions and the purified acid-free cumene returned for recycling to the first tank. The afforded yield of cumene hydroperoxide was 95 mols percent of theory.

When oxidation was effected under conditions wherein the temperatures of the 4 tanks were maintained at 114.7°C., 107.5°C., 101.8°C. and 97.2°C., and R values of 0.40, 0.38, 0.61, 0.61, and concentration of cumene hydroperoxide 11.5, 20.3, 28.1 and 33.5 weight percent of the reaction mixture, respectively, the yield of cumene hydroperoxide was 91.2 mol percent.

When cumene was oxidized in a train comprising 6 tanks and under conditions wherein the temperatures, R values and concentration of cumene hydroperoxide were respectively (101.3°; 1.2; and 11.6 weight percent), (99.2°C; 0.6 and 20.4 weight percent), (96.4°C.; 0.96; and 25 weight percent), (96.5; 0.96; and 30.3 weight percent), (96.0°C.; 0.96; and 35.2 weight percent), and (94.5°C.; 0.96 and 40.1 weight percent), and the oxidation rate corresponded to the formation of 39,487 pounds per hour of cumene hydroperoxide, the peroxide yield was 92.2 mol percent.

We claim:

1. In a method for the continuous preparation of cumene hydroperoxide from cumene wherein cumene is reacted with an oxygen-containing gas and the cumene hydroperoxide thus obtained is continuously recovered and unoxidized cumene is separated therefrom, purified, freed of acid, and continuously recycled to the reaction mixture as a first recycle stream, the improvement which comprises:
   a. continuously adding to the reaction mixture fresh cumene having a purity of at least 99.8 percent;
   b. intimately contacting said cumene with oxygen in at least one oxidation reactor by passing through the reaction mixture a continuous stream of an oxygen-containing gas containing at least 8 mol percent of oxygen at a rate wherein the ratio of mols of oxygen supplied per hour to the maximum amount of oxygen consumable per hour exceeds 0.25, and the exit gases produced contain from 3-10 percent oxygen, and continuously removing a liquid stream from said oxidation reactor and recovering the cumene hydroperoxide therefrom;
   c. maintaining the reaction temperature at about 80°–120°C. and the concentration of cumene hydroperoxide in the reaction mixture at a concentration of about 8–40 percent;
   d. condensing the exit gases, separating the unoxidized cumene therefrom, treating the separated cumene with an alkali metal hydroxide, followed by washing it with water and recycling it as a second recycle stream; and
   e. wherein said reaction is effected without the addition of an initiator, catalyst, or an alkalizing agent.

2. The process of claim 1 wherein said alkali metal hydroxide comprises a 1 to 5 percent aqueous solution of sodium hydroxide.

3. The process of claim 2 wherein said oxygen-containing gas is air.

4. In a method for the continuous preparation of cumene hydroperoxide from cumene wherein cumene is reacted with an oxygen-containing gas in a series of heatcontrolled reaction zones and the cumene hydroperoxide thus obtained is continuously removed and unoxidized cumene is separated therefrom, purified and continuously recycled to the reaction mixture as a first recycle stream, the improvement which comprises:
   a. continuously adding to a first reaction zone of the series fresh cumene having a purity of at least 99.8 percent;
   b. intimately contacting said cumene with oxygen in said reaction zones by passing through the reaction mixture a continuous stream of oxygen-containing gas containing at least 8 mol percent oxygen through each oxidizing zone at a rate wherein the ratio of the mols of oxygen supplied per hour to the maximum amount of oxygen consumable per hour exceeds 0.25, and the exit gases produced contain from 3–10 percent oxygen, and continuously removing a liquid stream from said last zone and recovering the cumene hydroperoxide therefrom;
   c. maintaining said reaction zones at successively lower temperatures, said first zone being maintained at not greater than 120°C. and the last zone being maintained at a temperature not lower than 80°C.;
   d. maintaining the cumene hydroperoxide concentration in said zones at successively higher levels, said first zone having a concentration of not less than 10 percent and said last zone having a concentration of not more than 40 percent; and
   e. condensing said exit gases from said oxidizing zones, separating the unoxidized cumene therefrom, treating the separated cumene first with an aqueous solution of an alkali metal hydroxide, then washing it with water and recycling the purified and acid-free cumene to the reaction mixture as a second recycle stream; and
   f. wherein said reaction is effected without the addition of an initiator, catalyst, or an alkalizing agent.

5. The method of claim 4 wherein the temperature is not greater than 115°C. in the first zone and not less than 90°C. in the last zone and wherein the concentration of cumene hydroperoxide is between 10 and 15 percent in the first zone and between 27 and 32 percent in the last zone.

6. In a method for the continuous preparation of cumene hydroperoxide from cumene wherein cumene and an oxygen-containing gas are passed through a series of heat-controlled reaction zones and the cumene hydroperoxide thus obtained is continuously removed and unoxidized cumene is separated therefrom, purified and recycled to the reaction mixture as a first recycle stream, the improvement which comprises:
   a. continuously adding to the first reaction zone fresh cumene having a purity of at least 99.8 percent;
   b. intimately contacting said cumene with oxygen in said reaction zones by passing through the reaction mixture a continuous stream of oxygen-containing gas containing at least 8 mol percent of oxygen through each oxidizing zone at a rate wherein the ratio of the mols of oxygen supplied per hour to the maximum amount of oxygen consumable per hour exceeds 0.25, and the exit gases produced contain from 3–10 percent oxygen, and continuously removing a liquid stream from said last zone and recovering the cumene hydroperoxide therefrom;
   c. maintaining said zones at successively lower temperatures, said first zone being maintained at not greater than 120°C. and said last zone being maintained at a temperature not less than 80°C.;

d. maintaining a cumene hydroperoxide concentration in said zones at successively higher levels, said first zone having a concentration of not less than 8 percent and said last zone having a concentration of not more than 40 percent; and e. condensing said exit gases from said oxidizing zones, separating the unoxidized cumene therefrom, combining the separated cumene with said first recycle stream and treating the combined cumene stream first with an aqueous solution of an alkali metal hydroxide, then washing it with water and recycling the combined purified and acid-free cumene stream; and f. wherein said reaction is effected without the addition of an initiator, catalyst, or an alkalizing agent.

7. The method of claim 6 wherein the temperature is not greater than 115°C. in the first zone and not less than 90°C. in the last zone and wherein the concentration of cumene hydroperoxide in the first zone is between 10 and 15 percent and 27 and 32 percent in the last zone.

* * * * *